United States Patent [19]
Tomita et al.

[11] Patent Number: 5,903,411
[45] Date of Patent: *May 11, 1999

[54] METHOD FOR RELIABLY POSITIONING A HEAD IN A DISK DRIVE TO A GUARD BAND AREA

[75] Inventors: Isamu Tomita; Tatsuro Sasamoto; Yoshihiro Nakao, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/599,808

[22] Filed: Feb. 12, 1996

[30] Foreign Application Priority Data

Feb. 14, 1995  [JP]  Japan .................. 7-025459

[51] Int. Cl.⁶ ........................................ G11B 5/596
[52] U.S. Cl. .................... 360/78.14; 360/77.05; 360/77.11
[58] Field of Search ................ 360/75, 31, 48, 360/78.14, 77.11, 77.04, 77.02, 78.04, 77.05, 53

[56] References Cited

U.S. PATENT DOCUMENTS

| | | | |
|---|---|---|---|
| 4,839,753 | 6/1989 | Ide et al. | 360/48 |
| 4,847,704 | 7/1989 | Iizumi et al. | 360/48 |
| 5,189,566 | 2/1993 | Christensen et al. | 360/62 X |
| 5,461,517 | 10/1995 | Suda et al. | 360/66 X |

FOREIGN PATENT DOCUMENTS

| | | |
|---|---|---|
| 52-46805 | 4/1977 | Japan . |
| 56-93147 | 7/1981 | Japan . |
| 57-198513 | 12/1982 | Japan . |
| 58-169376 | 10/1983 | Japan . |
| 59-48821 | 3/1984 | Japan . |
| 6423476 | 1/1989 | Japan . |
| 2-210601 | 8/1990 | Japan . |
| 4-40678 | 2/1992 | Japan . |
| 4-205977 | 7/1992 | Japan . |
| 4205977 | 7/1992 | Japan . |
| 4-241276 | 8/1992 | Japan . |
| 5-81772 | 4/1993 | Japan . |
| 581604 | 4/1993 | Japan . |
| 5-225725 | 9/1993 | Japan . |
| 62-23308 | 8/1994 | Japan . |

*Primary Examiner*—Alan Faber
*Attorney, Agent, or Firm*—Greer, Burns & Crain, Ltd.

[57] ABSTRACT

A storage device includes a predetermined number of disks on which servo information is recorded, and a predetermined number of heads. The heads are positioned on target cylinders on the basis of the servo information read from the disks through the heads, so that information recording/reproducing can be performed. The disks include outer guard band areas located further out than data areas and inner guard band areas located further in than the data area. Analysis information concerning disk surfaces are recorded on the outer guard band areas. Each of the outer guard band areas is segmented into first and second outer guard band areas in a radial direction. The analysis information is recorded on the first outer guard band area. The servo information for an off-track correction is recorded on the second outer guard band area.

6 Claims, 14 Drawing Sheets

BIT "0"

BIT "1"

FIG.4A
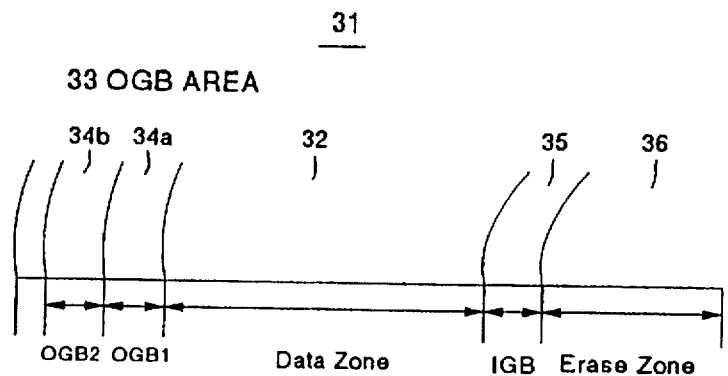
FIG.4B
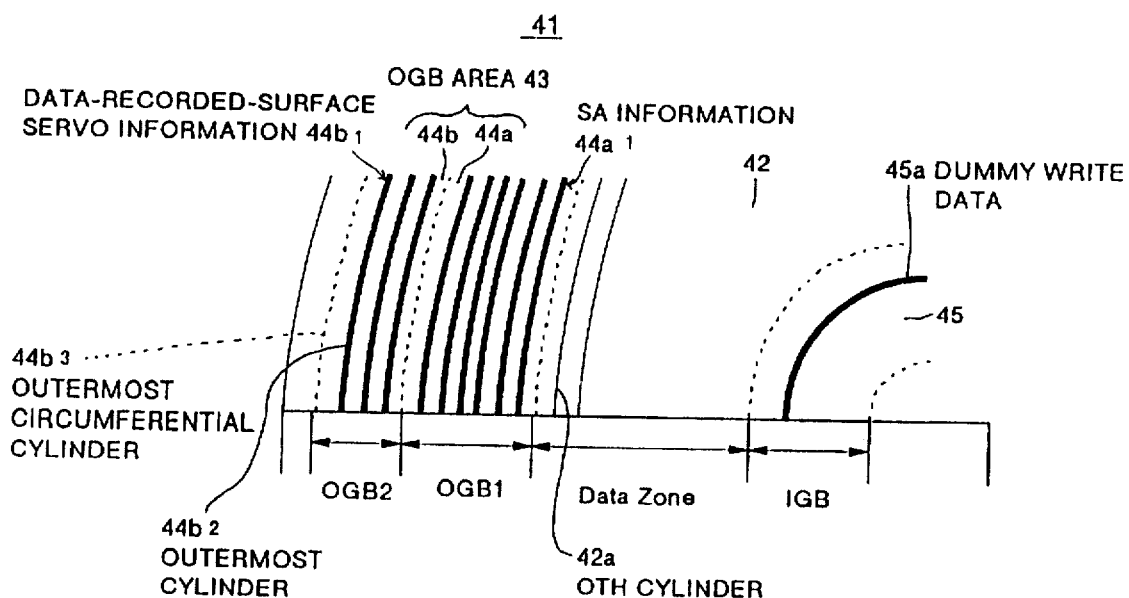
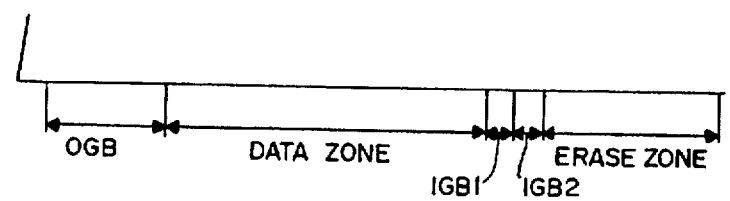
FIG. 4C

METHOD FOR RELIABLY POSITIONING A HEAD IN A DISK DRIVE TO A GUARD BAND AREA

BACKGROUND OF THE INVENTION

1. Field of the Invention

The present invention generally relates to storage devices, and more particularly to a storage device which performs a data recording/reproducing operation on a disk-shaped medium while a head seek operation is performed on the basis of control information recorded on the disk-shaped medium.

Recently, the recording density of storage devices as described above has been increased and various improvements have been proposed and employed. Examples of such improvements are a data-recorded-surface servo for compensating for off-track of a head with respect to the disk medium, a magnetoresistive effect (MR) head, and ID-less (ID is information for writing and reading) format. When the MR head is used as a data head, the characteristic of the MR head is varied each time the write operation is performed. If a read error occurs, a dummy write is executed as a retry process, so that the characteristic of the MR head is recovered to the normal state. A process is also employed in which servo information is written into a guard band of the disk medium in order to prevent an erroneous detection of an index due to write noise.

2. Description of the Related Art

A magnetic disk drive is one of the storage devices, and a predetermined number of magnetic heads provided to a predetermined number of magnetic disks. In a seek operation, the magnetic heads are moved in the radial direction of the magnetic disks, and information recording/reproducing operations are carried out on the target cylinders. A seek control is performed in order to correctly position the magnetic heads on the target cylinders. In such a seek control, a closed-loop servo control is performed while servo information recorded on the magnetic disks beforehand is read. Such a servo control is classified into a servo-surface servo or a data-recorded-surface servo. In the servo-surface servo, servo information is recorded on a specific servo surface. In the data-recorded-surface servo, servo information is recorded on a data surface.

FIGS. 1A and 1B show a conventional magnetic disk related to the servo-surface servo. More particularly, FIG. 1 shows a servo disk 11, and FIG. 1B shows a data disk 21. In the servo-surface servo, a single servo disk and a predetermined number of data disks are used.

The servo disk 11 shown in FIG. 1A records servo information for the seek operation. A servo area on which servo information is recorded is divided, according to combinations shown in FIGS. 3A and 3B, into an outer guard band OGB, a data area and an inner guard band IGB. A first OGB (Outer Guard Band) area 13 and a second OGB area 14 are arranged further out than a data area 12. First outer guard band information is recorded on the first OGB area, and second outer guard band information is recorded on the second OGB. An IGB (Inner Guard Band) area 15 on which inner guard band information is recorded is located further in than the servo area 12.

The data disk 21 shown in FIG. 1B has a data area 22 on which data is recorded. A first OGB area 23 and a second OGB area 24 are located further out in a radial direction from a center of the data disk 21 than the data area 22. Servo information for correcting an off-track due to errors of the positions of the magnetic heads is recorded on the first OGB area 23. No information is recorded on the second OGB area 24. An IGB area 25 on which no information is recorded is located further in than the data area 22 in a radial direction from a center of the data disk 21.

The data-recorded-surface servo does not use the servo disk 11 shown in FIG. 1A, but uses a predetermined number of data disks 21 only. On the data disk, provided are servo information areas 26 which extend radially from the disk center. On the servo information areas 26, recorded are information concerning sectors, cylinders, head addresses, indexes and guard band information.

A single index is recorded on each of all the cylinders (including the OGBs) of the servo disk 11 in the servo-surface servo. A single index is recorded on each of the cylinders (including the OGBs) of each data disk in the data-recorded-surface servo. Surface analysis information, which may include information of a defective sector and various types of information, is recorded on a predetermined number of cylinders located further in than the data area of each data disk irrespective of whether the servo is the servo-surface servo or the data-recorded-surface servo.

The above-mentioned structure in which the servo information is recorded on the first OGB areas 13 and 23 of the magnetic disks 11 and 21 in the servo-surface servo and the data-recorded-surface servo is disclosed in Japanese Laid-Open Patent Application Nos. 52-46805, 4-40678, 4-205977 and 5-225725. Further, Japanese Laid-Open Patent Application No. 2-10601 discloses that the first OGB area 23 of the data disk is used as a data area, and can also be used as an effective data area.

The index is detected in the magnetic disk drives using the servo disk 11 and the data disks 21 related to the servo-surface servo or the data disks related to the data-recorded-surface servo. The servo control directed to positioning the magnetic heads on the target cylinders is carried out with respect to the position of the detected index. In this way, the recording/reproducing operation can be performed.

When an MR head is used as a data head as has been described previously, a read error may take place because the head characteristic is varied each time the write operation is performed. In this case, a dummy write operation on a specific dummy write cylinder is performed as a retry process after the occurrence of the read error. Hence, the head characteristic can be recovered to the normal one. In this case, the dummy write operation is carried out with respect to the data cylinders and the first OGB area 23 on each of the data disks 21 irrespective of whether the servo is the data-recorded-surface servo or the servo-surface servo.

FIG. 2 is a timing chart of the conventional dummy write operation. More particularly, FIG. 2 shows a dummy write operation on the first OGB area 23 in the servo-surface servo. Index information (index pattern "01011") of a cylinder on the servo disk 11 on which the dummy write operation is carried out is detected. Then, a write gate is maintained in the open state until the next GB information over the first GB information (GB pattern "01010") after the detection of the above index information. In this state, the dummy write operation is performed. After the dummy write operation, the servo information concerning the data surface for the off-track correction is read.

However, in the dummy write operation in the data-recorded-surface servo, the ID information cannot be correctly read in such a state where a read error occurs. Hence, it is not possible to determine whether the data head is correctly positioned on the dummy cylinder. Hence, there is a possibility that the dummy write operation may be carried out on a data cylinder and data may be deleted.

In the following case, servo information concerning the data surface for the off-track correction and/or the surface analysis information may be deleted if the cylinder address has an error. That is, an area subjected to the dummy write operation is provided in the first OGB area 23 or the area on which the surface analysis information is recorded in order to perform the reading of the dummy write operation and reading of the servo information and the surface analysis information with respect to the same cylinder. In this case, the dummy write can be unconditionally performed.

When the servo information is written or the dummy write operation is performed in the servo-surface servo, the index pattern, e.g. "01011" and the GB information, e.g. "01010" are set, as shown in FIG. 2.

FIGS. 3A and 3B show bit patterns. More particularly, FIG. 3A shows bit "0", and FIG. 3B shows bit "1". When a missing pulse as indicated by the broken line in FIG. 3B is detected with respect to bit "1", the bit pattern becomes bit "0" shown in FIG. 3A. The difference between the index pattern and the GB pattern is one bit (normally, the difference is represented by one bit or two bits). Hence, if the missing occurs due to write noise, the GB pattern is mistakenly detected as the index pattern. This problem is serious in not only the dummy write operation but also the recording of the data-recorded-surface servo information.

If the index pattern is mistakenly detected when the dummy write operation is carried out on the first OGB area 23 of the servo disk 11 on which the servo information is recorded, the servo information is deleted.

SUMMARY OF THE INVENTION

It is a general object of the present invention to provide a storage device in which the above disadvantages are eliminated.

A more specific object of the present invention is to provide a storage device in which the data area can be expanded and the control information can be protected, and in which the index information can be correctly detected and to provide a method for controlling such a storage device.

The above objects of the present invention are achieved by a storage device comprising:

a predetermined number of disks on which servo information is recorded; and a predetermined number of heads, the heads being positioned on target cylinders on the basis of the servo information read from the disks through the heads, so that information recording/reproducing can be performed, the disks respectively comprising outer guard band areas located further out than data areas and inner guard band areas located further in than the data area, analysis information concerning disk surfaces being recorded on the outer guard band areas.

Each of the outer guard band areas is segmented into first and second outer guard band areas in a radial direction; the analysis information is recorded on the first outer guard band area; and servo information for an off-track correction is recorded on the second outer guard band area.

According to one aspect of the present invention, the first outer guard band area is located further in than the second outer guard band area.

According to another aspect of the present invention, the disks have inner guard band areas located further in than the data areas, dummy data being recordable on the inner guard band areas.

According to yet another aspect of the present invention, the heads are supported to an actuator; and the storage device comprises first means for rotating the actuator, and second means for supplying a driving current to the first means, the driving current including a current component which cancels an offset force and maintains the heads on outermost cylinders of the outer guard band areas on which the analysis information and the servo information are recorded.

According to another aspect of the present invention, the storage device further comprises third means for controlling, when the storage device is in a given state, the second means so that a seek operation is repeatedly carried out at predetermined intervals so that the heads are moved between outermost cylinders of the outer guard band areas or cylinders located further out than the outermost cylinders and cylinders of the inner guard band areas or cylinders located further in than the cylinders of the inner guard band areas.

According to another aspect of the present invention, each of the outer guard band areas further comprises a third outer guard band area located further out than the first and second outer guard band areas; and the storage device comprises means for performing a seek operation in which the heads are moved between the third outer guard band area and a given cylinder located further in than the first and second outer guard areas.

The above objects of the present invention are also achieved by a control method for controlling a storage device including a predetermined number of disks, servo information for correcting an off-track being recorded on outer guard band areas of the disks located further out of data areas thereof, guard band information being recorded on the disks, information recording/reproducing being performed through the heads, the control method comprising the steps of:

(a) performing a seek operation so that the heads are moved to outer guard band areas which are located further out than data areas and records servo information;

(b) confirming, based on the guard band information read from the disks through the heads, that the heads are located in the outer guard band areas on which the servo information is recorded; and (c) reading the servo information from the disks via the heads.

The above objects of the present invention are also achieved by a control method for controlling a storage device including a predetermined number of disks, servo information for correcting an off-track and analysis information concerning disk surfaces being recorded on outer guard band areas of the disks located further out of data areas thereof, guard band information being recorded on the disks, information recording/reproducing being performed through the heads, the control method comprising the steps of:

(a) performing a seek operation in which the heads are moved to the outer guard band areas on which the analysis information is recorded;

(b) confirming, based on the guard band information read from the disks through the heads, that the heads are located in the outer guard band areas on which the analysis information is recorded; and (c) reading the analysis information from the disks via the heads.

The above objects of the present invention are also achieved by a control method for controlling a storage device including a predetermined number of disks, servo information for correcting an off-track being recorded on outer guard band areas of the disks located further out of data areas thereof, guard band information being recorded on the disks, inner guard band areas being provided further in than the data areas, information recording/reproducing being performed through the heads, the control method comprising the steps of:

(a) performing a seek operation in which the heads are moved to the inner guard band areas which are used as areas into which dummy write data is written;

(b) confirming, based on the guard band information read from the disks through the heads, that the heads are located in the inner guard band areas; and (c) writing the dummy write data into the inner guard band areas.

According to one aspect of the present invention, the above step (c) is performed in a process of reading the servo information.

The above-mentioned objects of the present invention are also achieved by a storage device comprising:

a servo disk having a guard band area on which index information and guard band information are recorded;

data disks having respective, guard band areas which are subjected to a given write operation which is repeatedly carried out a predetermined number of times;

a servo head provided to the servo disk; and data heads provided to the data disks, the servo disk having a part of the guard band area corresponding to parts of the guard band areas of the data disks which are subjected to the given write operation, the part of the guard band area of the servo disk having no guard band information.

According to one aspect of the present invention, in the given write operation, predetermined servo information, dummy data or analysis information concerning surfaces of the data disks is written into the guard band areas of the data disks.

According to another aspect of the present invention, the predetermined servo information is servo information for an off-track correction.

According to yet another aspect of the present invention, the guard band areas comprise a first area on which given servo information is recorded, and a second area on which dummy data can be recorded.

The aforementioned objects of the present invention are also achieved by a storage device comprising:

a servo disk having a guard band area on which index information and guard band information are recorded;

data disks having respective, guard band areas which are subjected to a given write operation which is repeatedly carried out a predetermined number of times;

a servo head provided to the servo disk; and data heads provided to the data disks, the data disks having parts of the guard band areas corresponding to a part of the guard band area of the servo disk in which no guard band information is present, the parts of the guard band areas of the data disks having analysis information concerning surfaces of the data disks.

The aforementioned objects of the present invention are also achieved by a storage device comprising:

a servo disk having a guard band area on which index information and guard band information are recorded;

data disks having respective, guard band areas which are subjected to a given write operation which is repeatedly carried out a predetermined number of times;

a servo head provided to the servo disk;

data heads provided to the data disks, the data disks having dummy data areas which are parts of the guard band areas of the data disks on which the guard band information is not present, dummy data being recordable on the dummy data areas; and control means for reading the servo information after recording the dummy data.

According to a further aspect of the present invention, a storage device comprising:

a predetermined number of disks on which servo information is recorded; and a predetermined number of heads, the heads being positioned on target cylinders on the basis of the servo information read from the disks through the heads, so that information recording/reproducing can be performed, the disks respectively comprising outer guard band areas located further out than data areas and inner guard band areas located further in than the data areas, analysis information concerning disk surfaces being recorded on the outer guard band areas, wherein each of the inner guard band areas is segmented into first and second outer guard band areas in a radial direction;

the analysis information is recorded on the first outer guard band area; and servo information for an off-track correction is recorded on the second outer guard band area.

According to a further aspect of the present invention, a storage device comprising:

a predetermined number of disks on which servo information is recorded; and a predetermined number of heads, the heads being positioned on target cylinders on the basis of the servo information read from the disks through the heads, so that information recording/reproducing can be performed, the disks comprising outer guard band areas located further out than data areas and inner guard band areas located further in than the data areas, analysis information concerning disk surfaces being recorded on the outer guard band areas, wherein either the outer or inner guard band areas or both thereof are respectively segmented into first and second outer guard band areas in a radial direction;

the analysis information is recorded on the first outer guard band area; and servo information for an off-track correction is recorded on the second outer guard band area.

BRIEF DESCRIPTION OF THE DRAWINGS

Other objects, features and advantages of the present invention will become more apparent from the following detailed description when read in conjunction with the accompanying drawings, in which:

FIGS. 4A, 4B and 4C are diagrams of a first embodiment of the present invention;

DESCRIPTION OF THE PREFERRED EMBODIMENTS

Figure 1A:
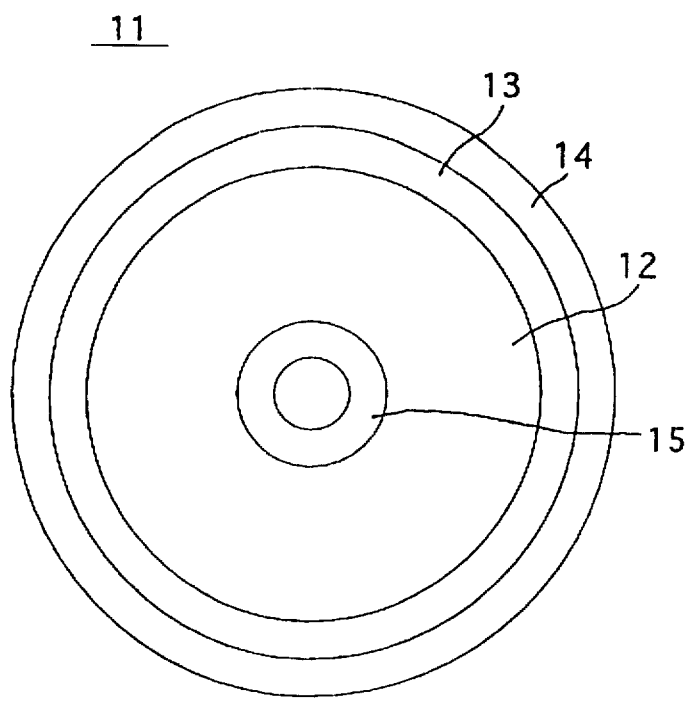
FIGS. 1A and 1B are diagrams of a conventional servo-surface servo type magnetic disk.
Figure 1B:
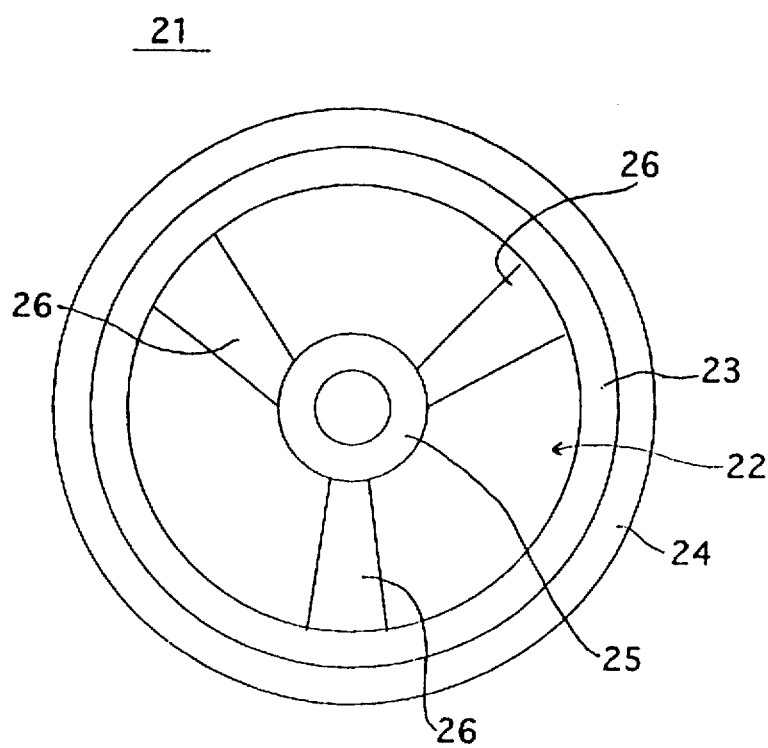
Figure 2:
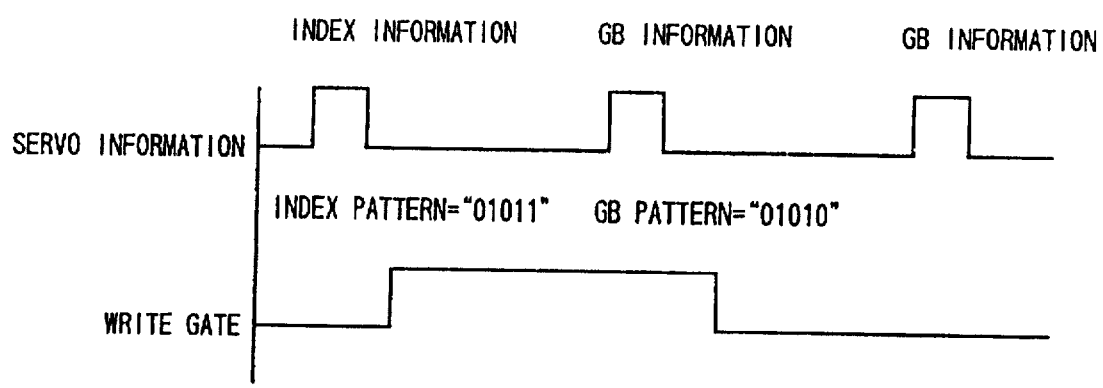
FIG. 2 is a timing chart of a conventional dummy write operation.
Figure 3A:
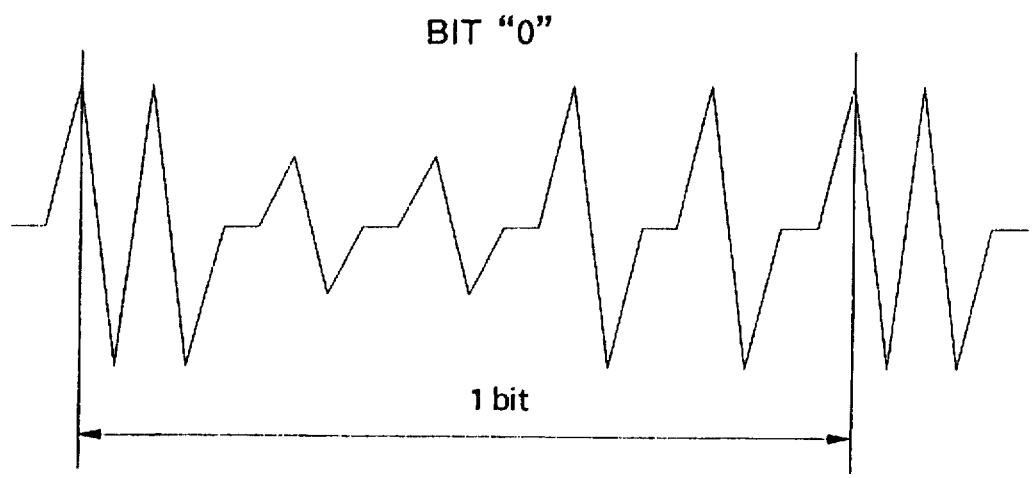
FIGS. 3A and 3B are diagrams of bit patterns.
Figure 3B:
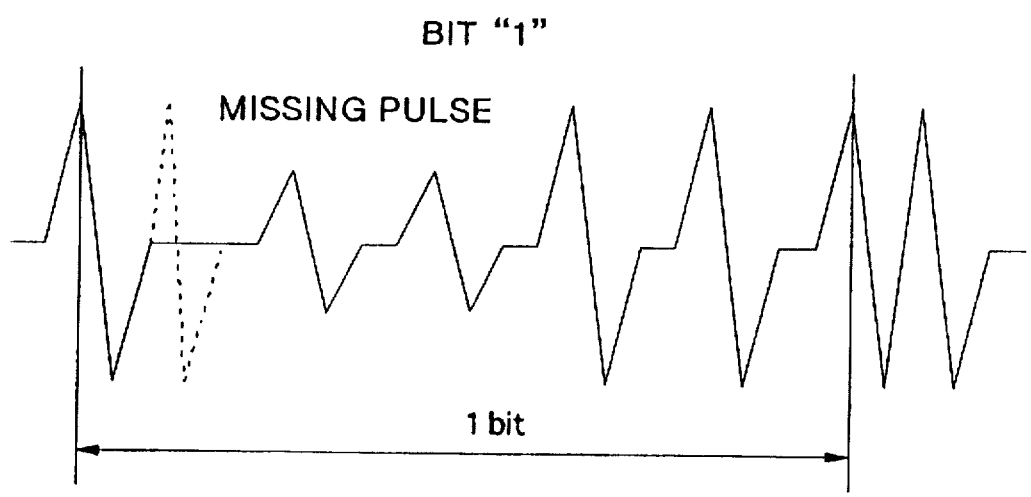

FIGS. 4A and 4B show a first embodiment of the present invention. More particularly, FIG. 4A shows the format of a servo disk, and FIG. 4B shows the format of a data disk. The servo process of a magnetic disk drive which is a version of the storage device is classified into aforementioned servo-surface servo or the data-recorded-surface servo. FIGS. 4A and 4B relate to the servo-surface servo. Hence, the magnetic disk drive according to the first embodiment of the present invention is equipped with one servo disk (FIG. 4A), and a plurality of data disks (FIG. 4B).

A servo disk 31 shown in FIG. 4A has a data area 32. An outer guard band (OGB) 33 is provided further out than the data area 32 in the radial direction. The OGB area 33 is partitioned into two in the radial direction. More particularly, the OGB area 33 has a first OGB (OGB1) area 34a, and a second OGB (OGB2) area 34b. First guard band information and second guard band information are respectively recorded on the first OGB area 34a and the second OGB area 34b.

An inner guard band (IGB) area 35 is provided further in than the data area 32 in the radial direction. IGB information is recorded on the IGB area 35. An erase area 36 is provided further in than the IGB area 35. An item of index information is recorded on each cylinder of the respective data area 32, the first and second OGB areas 34a and 34b and the IGB area 35. A plurality of items of the first and second OGB information are recorded on the first and second OGB areas 34a and 34b and the IGB area 35 so that the items are spaced apart from the index information by a given distance (see FIG. 13).

A data disk 41 shown in FIG. 4B has an OGB area 43 located further out than a data area 42 in the radial direction. The outermost of the data area 42 has the 0th cylinder 42a, and a predetermined number of sectors are radially provided in the radial direction. The OGB area 43 is partitioned into a first OGB (OGB1) area 44a, and a second OGB (OGB1) area 44b. Surface analysis information $44a_1$, which is analysis information concerning the data disk surface, is recorded on the OGB area 44a located further in than the second OGB area 44b. Data-recorded-surface servo information $44b_1$ for correcting an off-track is recorded on the second OGB area 44b. In this case, the outermost cylinder of the second OGB area 44b is an outermost cylinder $44b_2$, and the cylinder further out than the outermost cylinder $44b_2$ is an outermost circumferential cylinder $44b_3$.

The surface analysis information $44a_1$ is analysis information concerning the surface of the data disk 41. For example, the surface analysis information $44a_1$ is a variety of setting information, which may be defect information concerning a defective sector, and various setting parameters and format information concerning, for example, a sector size. The surface analysis information $44a_1$ includes an ID part and a data part. The data-recorded-surface servo information $44b_1$ is servo information for correcting off-track due to positional errors in the data heads.

An IGB area 45 is provided further in the data area 42 in the radial direction. Initially, no information is recorded on the IGB area 45. In the dummy write operation, dummy write data 45a is written into the IGB area 45. In this regard, the IGB area 45 functions as a dummy write area. When the data heads are MR heads, the dummy write operation is performed as described in Japanese Laid-Open Patent Application No. 6-223308 or Japanese Laid-Open Patent Application No. 5-81604. More particularly, data is written before reading to recover the MR heads to the normal state so that a distortion of the reproduced signals caused by after-write-noise can be corrected. The dummy write operation may be carried out when inductive heads are used as data heads.

The data area 32, the first and second OGB areas 34a and 34b and the IGB area 35 of the servo disk 31 correspond to the data area 42, the first and second OGB areas 44a and 44b and the IGB area 45 of the data disk 41, respectively.

The above arrangement of the surface analysis information $44a_1$, the data-recorded-surface servo information $44b_1$ and the dummy write area (IGB area 45) is made taking into account the following. In the ordinary use, the cylinders are used from the 0-th cylinder. Hence, there is a high possibility that the heads are located on the outer side. The above arrangement makes it possible to reduce the seek time from the data area 42 to the OGB area 43 and IGB area 45 when reading the defect information and measuring the amount of off-track at predetermined intervals. When a CDR (Constant Density Recording) is employed, the above arrangement makes it possible to increase the track capacity and reduce the number of cylinders necessary to record the surface analysis information. As a result, it becomes possible to reduce the number of times that the seek operation is carried out in order to read the surface analysis information.

Alternatively, as shown in FIG. 4C, it is possible to segment the inner guard band area into a first inner guard band area IGB1 and a second inner guard band area IGB2. The surface analysis information is recorded on one of the first and second inner guard band areas IGB1 and IGB2, and the servo information is recorded on the other segmented inner guard band area.

Alternatively, it is possible to use the combination of the structure shown in FIGS. 4A and 4B and the structure shown in FIG. 4C. In this case, the surface analysis information is recorded on both the segmented ones of the inner and outer guard band area, and the surface information is recorded on the other segmented ones thereof.

Figure 5:
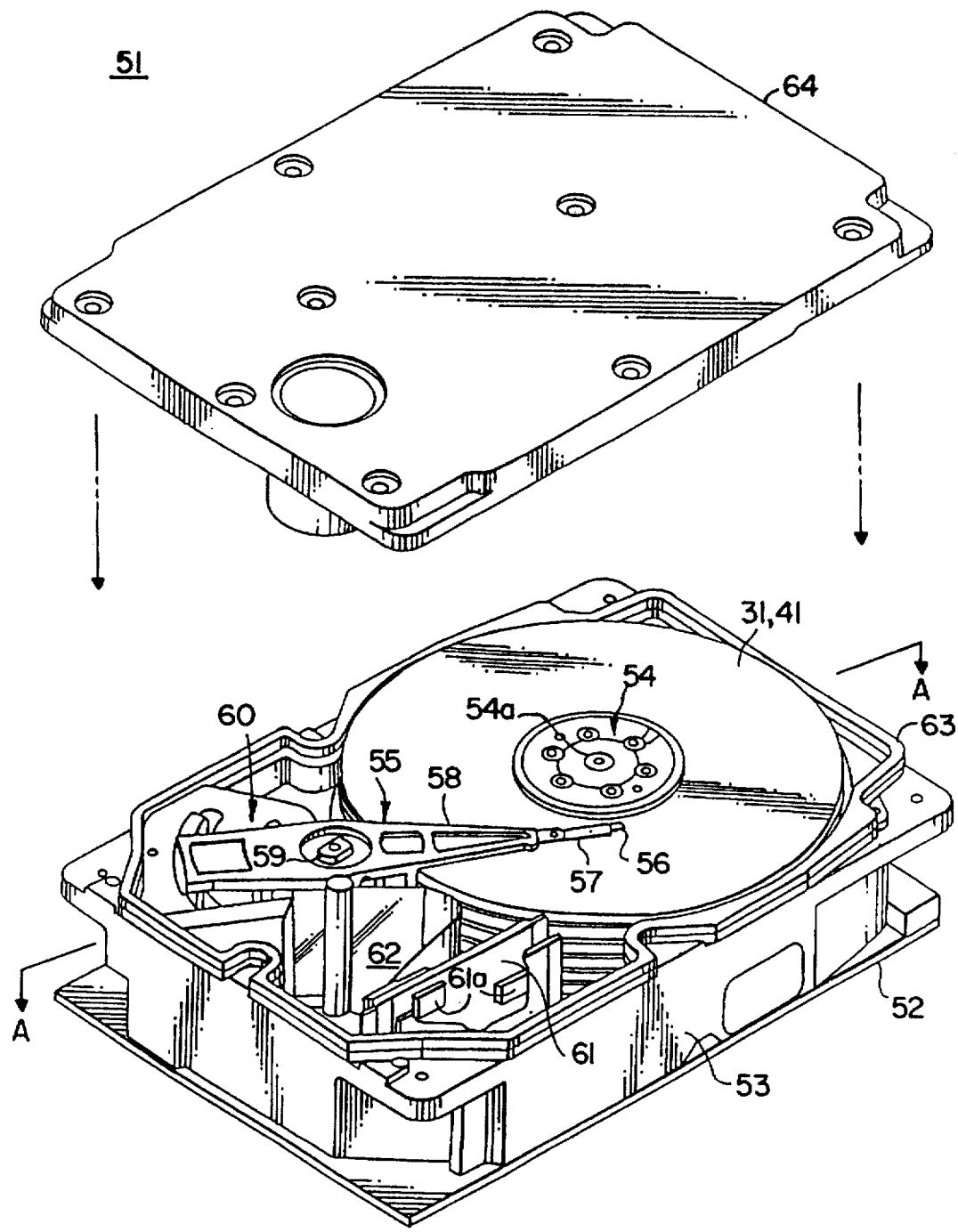
FIG. 5 is a partially exploded perspective view of a magnetic disk drive to which the present invention is applied.
Figure 6:
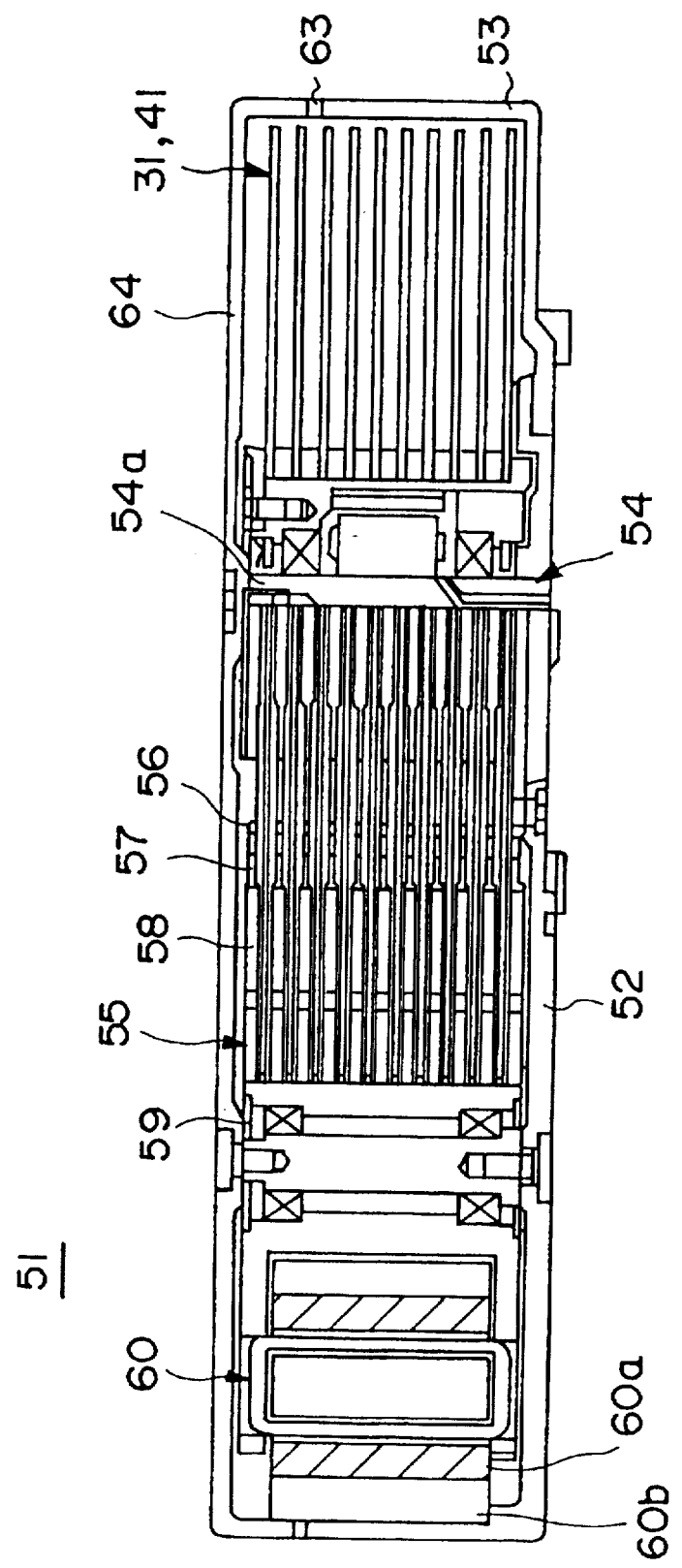
FIG. 6 is a cross-sectional view taken along a line A—A shown in FIG. 5.

FIG. 5 is a perspective view of a magnetic disk drive to which the present invention is applied. FIG. 6 is a cross-sectional view taken along a line A—A shown in FIG. 5. A magnetic disk drive 51 shown in FIGS. 5 and 6 has an enclosure 53 provided on a base 52. In the enclosure 53, the servo disk 31 and a predetermined number of data disks 41 are rotatably attached to a spindle 54a of a spindle mechanism 54. The servo disk 31 may be attached to the uppermost position, the lowermost position or the center position.

The actuator 55 has a predetermined number of arms 58 to which respective supporting spring mechanisms 57 are attached. Each of the supporting spring mechanism 57 mounts magnetic heads 56 (which are a servo head 56a associated with the servo disk 31 and a data head 56b associated with the corresponding data disk 41). A voice coil motor (VCM) 60, which is a driving means including a voice coil 60a and a magnet 60b, is provided on the side opposite, with respect to a rotary shaft 59, to the side of the arms 58 to which the magnetic heads 56 are provided.

A printed circuit board 61, on which head ICs 61a (a servo head IC $61a_1$ and a data head IC $61a_2$) are mounted, is connected to the VCM 60 via a flexible printed circuit board (FPC) 62. A cover 64 is attached to the enclosure 53 through a seal member 63.

Figure 7:
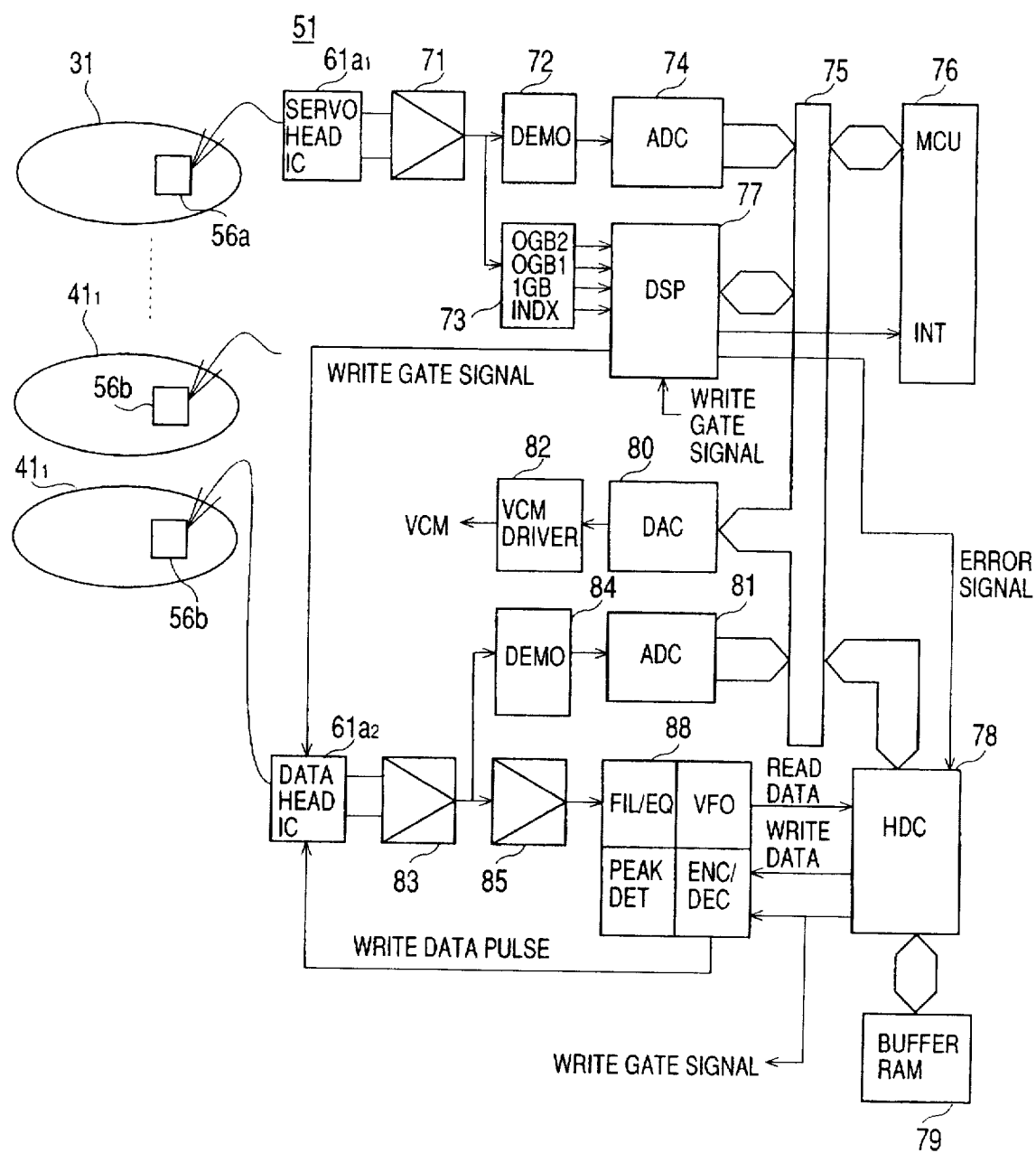
FIG. 7 is a block diagram of a control system of the magnetic disk drive.

FIG. 7 is a block diagram of the overall structure of a control system of the magnetic disk drive. A reproduced waveform read from the servo disk 31 through the servo head 56a is sent to a servo demodulation circuit 72 and a guard band detection circuit 73 via the servo head IC $61a_1$ and an AGC (Automatic Gain Control) circuit 71. A servo demodulation signal from the servo demodulation circuit 72 is sent to an ADC (Analog-to-Digital Converter) 74, which outputs a resultant digital signal. This digital signal is sent to an MCU (MicroController Unit) 76 via a bus 75.

The guard band detection circuit 73 detects, from the reproduced signal, the first and second GB (guard band) information provided in the first and second OGB areas OGB1 34a and OGB2 34b, the inner guard band information provided in the IGB area 35, and index information. The detected information items are sent to a DSP (Digital Signal Processor) 77 including a control logic. The DSP 77 sends an interrupt signal (INT) to the MCU 76 in a given case upon receipt of a write gate signal. Further, the DSP 77 sends an error signal related to the seek operation to an HDC (Hard Disk Controller) 78, which is equipped with a buffer RAM 79.

The ADC 74, the MCU 76, the DSP 77 and HDC 78 are connected to the bus 75, to which a DAC (Digital-to-Analog Converter) 80 and an ADC 81 are connected thereto. The DAC 80 converts a control signal for driving the VCM from the MCU 76 into an analog signal, which is then supplied to a VCM driver 82. This VCM driver 82 supplies the voice coil 60a with a given current in order to rotate the actuator 55.

A selected data head among the heads 56b over the data disks $41_1$, $41_2$, . . . . , sends read information to the data head IC $61a_2$, to which a write data pulse produced by an encoder (which will be described later) in response to the write gate signal from the DSP 77 is supplied. Read information obtained via the data head IC $61a_2$ is supplied to a data servo demodulation circuit 84 via a buffer amplifier 83 and supplied to a read channel IC 86 via an AGC amplifier 85.

The data servo demodulation circuit 84 demodulates the servo information on the data disk 41, and supplies the demodulated servo information to the DSP 77 via the ADC 81. The read channel IC 86 includes a filter/equalizer circuit, a VFO (Variable Frequency Oscillator), an encoder/decoder and a peak detection circuit. Read data is sent to the HDC 78 from the VFO. The HDC 78 sends the write gate signal to the DSP 77 and the data head IC $61a_2$, and sends write data to the encoder/decoder.

Figure 8A:
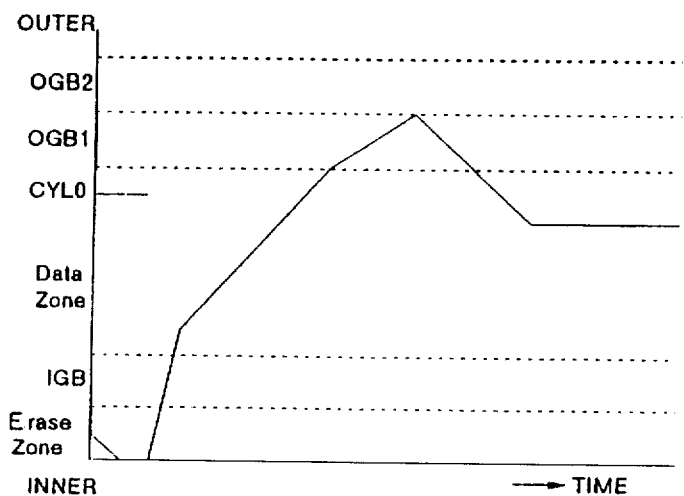
FIGS. 8A, 8B and 8C are sequence diagrams of seek operations in which heads are moved to given positions.
Figure 8B:
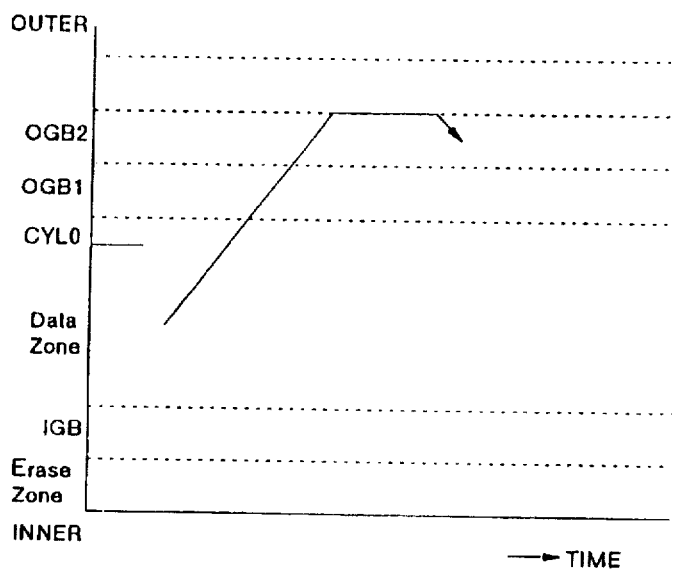
Figure 8C:
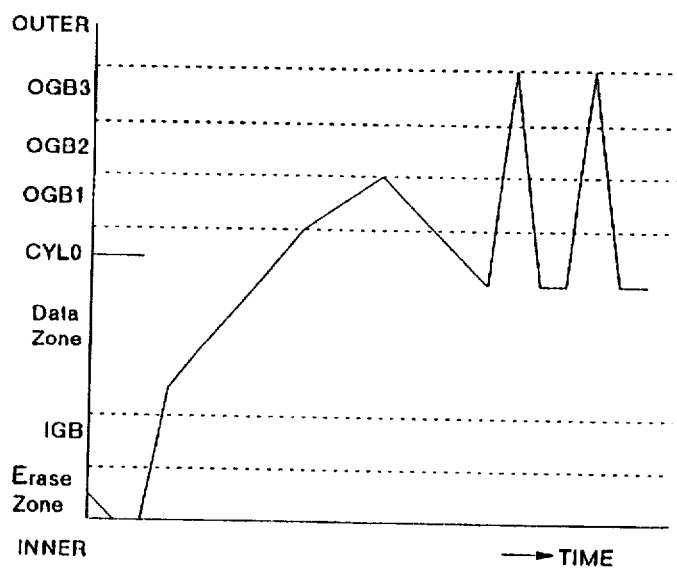

FIGS. 8A, 8B and 8C show a sequence of the seek operation in which the heads are moved to a given position. More particularly, FIG. 8A shows a return-to-zero (RTZ) operation. The operation is initiated from the erase area by supplying a given determined to the VCM 60. Then, the reading of the servo signal is started at the servo data area 32 after the head passes over the IGB area 35. Then, the head is moved at the head movement speed defined from the read servo signal. Then, the head movement speed is reduced when the first OGB area 34a is detected. When the second OGB area 34b is detected, the movement is reversed to the opposite direction and positions the head at the 0-th cylinder.

FIG. 8B shows a sequence in which the servo head 56a is positioned at the outermost cylinder of the second OGB area 34b at the time of an offset cancel (which will be described later with reference to FIG. 12), and the current supplied to maintain the above state is detected. FIG. 8C shows a sequence in which the seek operation is performed between a third OGB area (which will be described later) and the 0-th cylinder a predetermined number of times after the above-mentioned return-to-zero operation. The detail of the sequences shown in FIGS. 8B and 8C will be described later.

Figure 9:
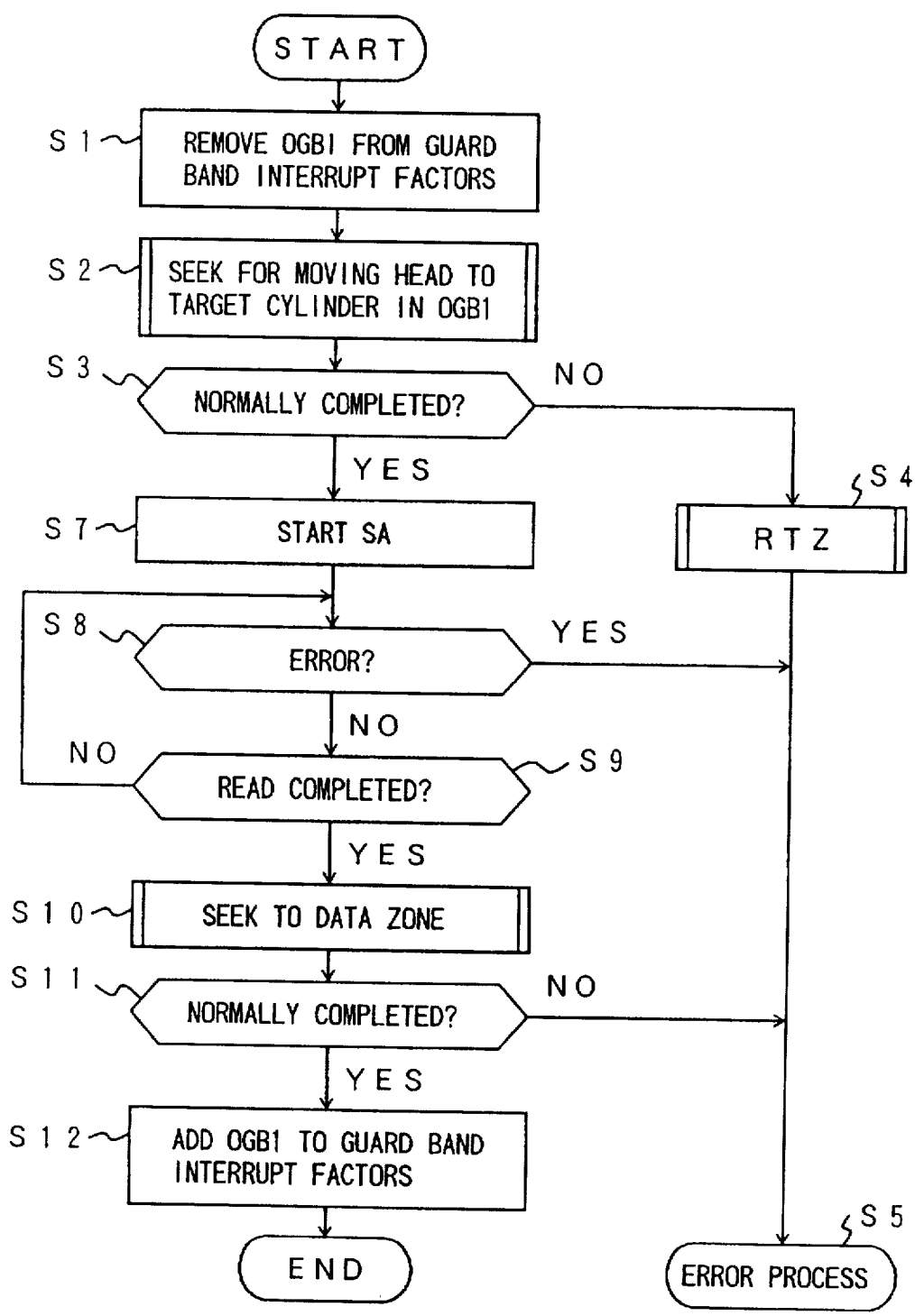
FIG. 9 is a flowchart of a process for reading surface analysis information.

FIG. 9 is a flowchart of reading of the surface analysis (SA) information, and more particularly shows a read sequence in which the surface analysis information $44a_1$ recorded on the first OGB area 44a of the data disk 41 is read. When an SA information read instruction is issued, the factor related to the first OGB area (OGB1) 44a is removed from factors of the guard band interrupt (step S1). This is intended to prevent occurrence of a seek error (detection of the guard band). It will be noted that normally the read or write operation is immediately stopped when the guard band is detected in order to prevent data from being damaged. In this way, the data can be protected. Hence, the read/write operation on the guard band cannot be performed unless a guard band signal is masked.

Next, a seek operation is carried out in which the servo head 56a (data head 56b) is moved to the read cylinder in the first OGB area 44a (step S2), and it is determined whether the seek operation is correctly completed (step S3). For instance, if the seek operation is not completed correctly, the non-return-zero operation is performed (step S4), and an error process which may be the retry process is carried out (step S5).

When the seek operation is correctly completed, the reading of the surface analysis information is started (step S7). In the reading operation, it is determined whether an error resulting from a mechanical factor occurs in the reading operation (step S8). When it is determined that such an error has occurred, the error process which may be the retry process is carried out (step S5).

When the reading operation is completed without any error (step S9), the servo head 56a (data head 56b) is moved to the given cylinder in the data area 32 (42) (step S10). If the reading operation is not completed correctly (step S11), the error process which may be the retry process is performed (step S5).

When the seek operation is correctly completed, the factor related to the first OGB area 44a (OGB1) is added to the factors of the guard band interrupt (step S12). Then, the process is ended.

Figure 10:
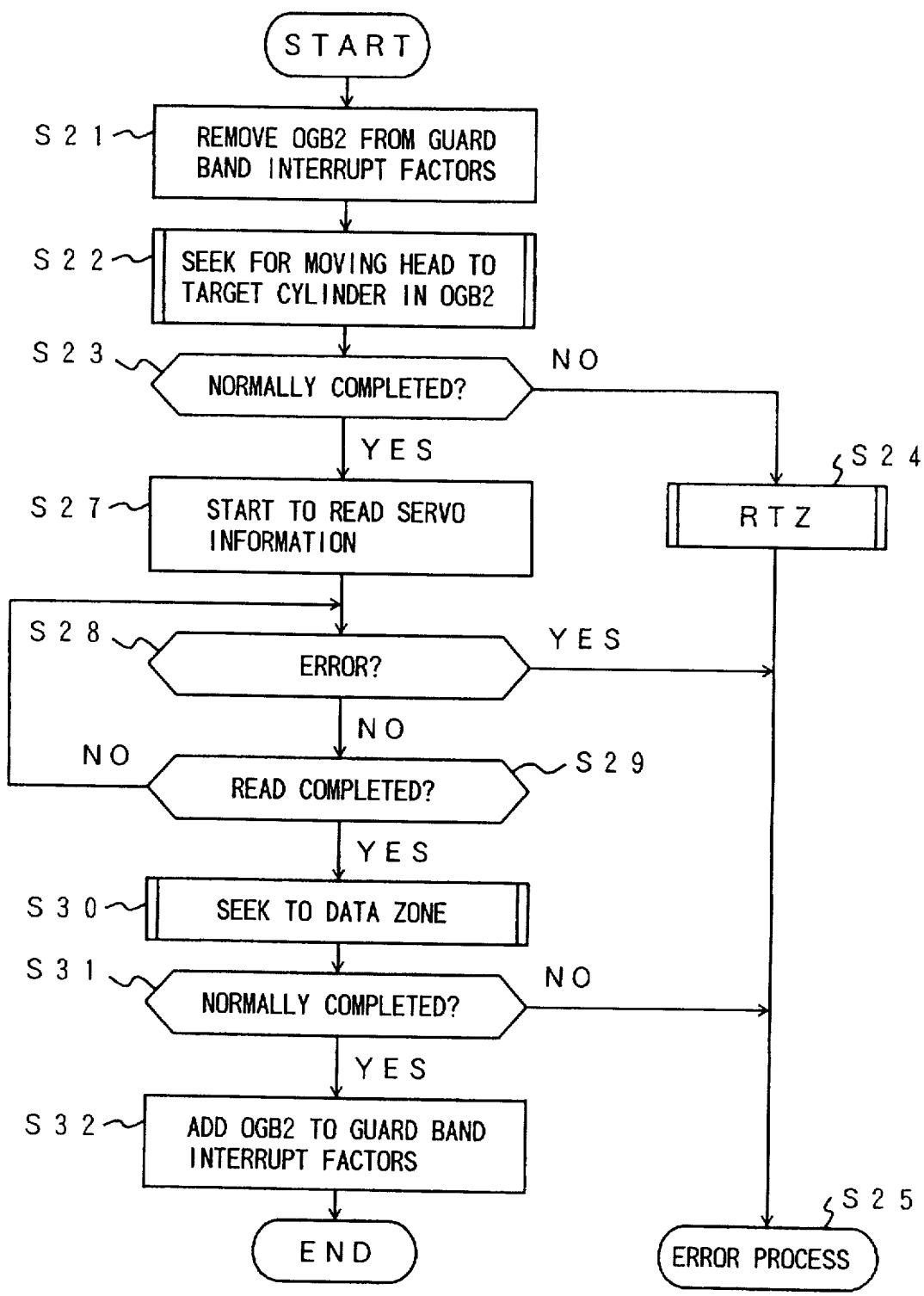
FIG. 10 is a flow chart of a process for reading data-recorded-surface servo information.

FIG. 10 is a flowchart of reading the data-recorded-surface servo information. More particularly, FIG. 10 relates to a case where the data-recorded-surface servo information $44b_1$ recorded on the second OGB area 44b of the data disk 41 is read.

When an instruction to read the data-recorded-surface servo information is issued, the factor related to the second OGB area (OGB2) 44b is removed from the factors of the guard band interrupt (step S21). This is intended to prevent occurrence of a seek error (detection of the guard band).

Next, a seek operation is carried out in which the servo head 56a (data head 56b) is moved to the read cylinder in the second OGB area 44b (step S22), and it is determined whether the seek operation is correctly completed (step S23). For instance, if the seek operation is not completed correctly, the non-return-zero operation is performed (step S24), and an error process which may be the retry process is carried out (step S25).

When the seek operation is correctly completed, the reading of the surface analysis information is started (step S27). In the reading operation, it is determined whether an error resulting from a mechanical factor occurs in the reading operation (step S28). When it is determined that such an error has occurred, the error process which may be the retry process is carried out (step S25).

When the reading operation is completed without any error (step S29), the servo head 56a (data head 56b) is moved to the given cylinder in the data area 32 (42) (step S30). If the reading operation is not completed correctly (step S31), the error process which may be the retry process is performed (step S25).

When the seek operation is correctly completed, the factor related to the second OGB area 44b (OGB2) is added to the factors of the guard band interrupt (step S32). Then, the process is ended.

Figure 11:
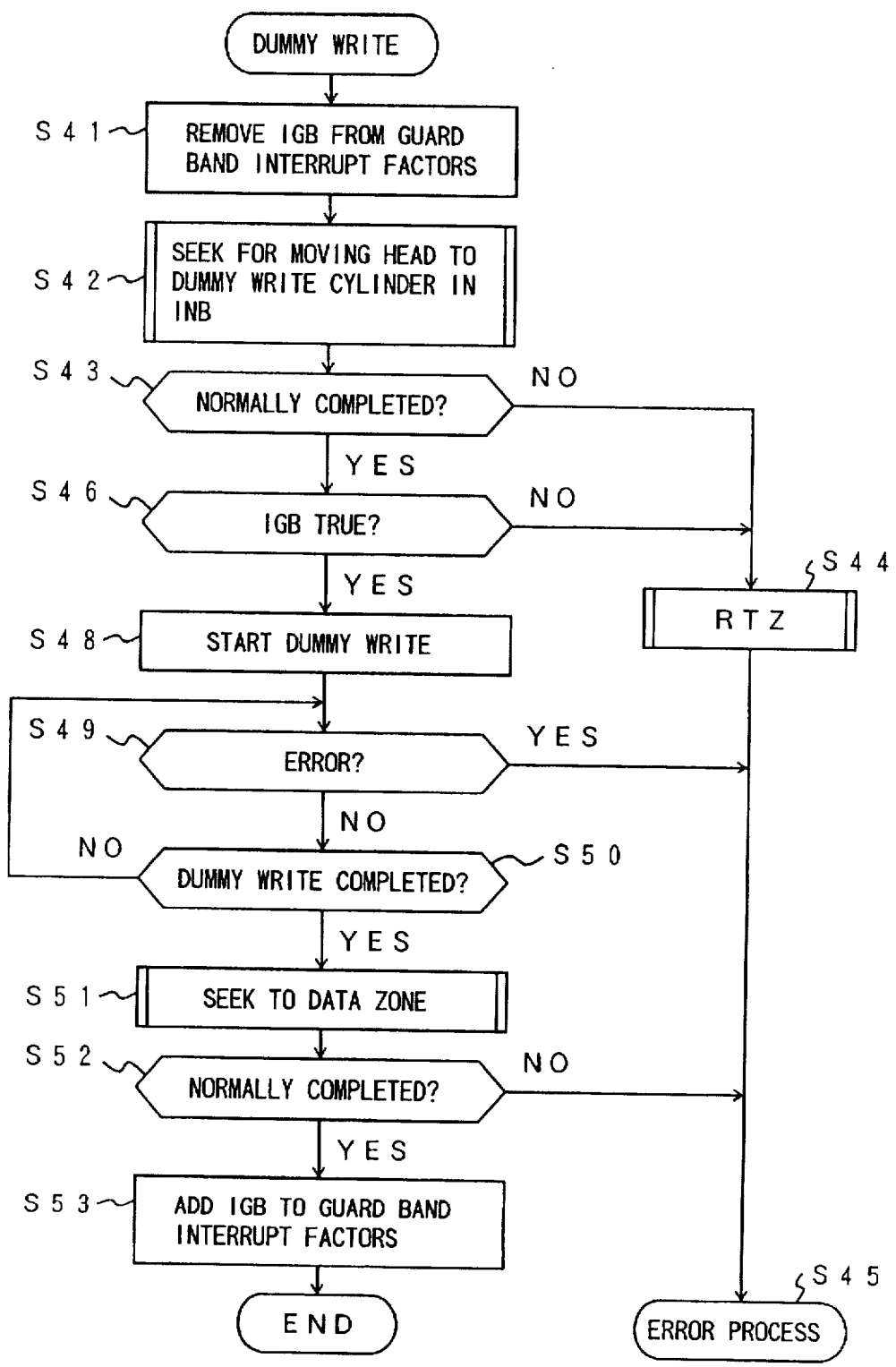
FIG. 11 is a flowchart of a dummy write operation.

FIG. 11 is a flowchart of the dummy write operation. More particularly, FIG. 11 relates to a case where given dummy data is written into the IGB area 45 of the data disk 41 by the dummy write operation.

When an instruction to execute the dummy write operation is issued, the factor related to the IGB area 45 is removed from the factors of the guard band interrupt (step S41). This is intended to prevent occurrence of a seek error.

Next, a seek operation is carried out in which the servo head 56a (data head 56b) is moved to the dummy write cylinder in the IGB area 45 (step S42), and it is determined whether the seek operation is correctly completed (step S43). For instance, if no current is supplied to the VCM 60, it is concluded that an error has occurred and the non-return-zero operation is performed (step S44), and an error process which may be the retry process is carried out (step S45).

When the seek operation is correctly completed, it is confirmed whether the IGB information is read by the guard band 56b (step S46). When the IGB information is not read, the RTZ process is carried out (step S44), and the error process such as the retry process is carried out (step S45).

When the IGB information is correctly read, the dummy write is started (step S48). In the reading operation, it is determined whether an error resulting from a mechanical factor occurs in the reading operation (step S49). When it is determined that such an error has occurred, the error process which may be the retry process is carried out (step S45).

When the reading operation is completed without any error (step S50), the servo head 56a (data head 56b) is moved to the given cylinder in the data area 32 (42) (step S51). If the reading operation is not completed correctly (step S52), the error process which may be the retry process is performed (step S45).

When the seek operation is correctly completed, the factor related to the IGB area 45 is added to the factors of the guard band interrupt (step S53). Then, the process is ended.

As described above, it is possible to expand the data area 42 by arranging the surface analysis information $44a_1$ (which was recorded on the data area of the data disk in the conventional art) in the first OGB area 44a. Further, it is possible to confirm that the servo head is positioned in the target place when reading the surface analysis information 44a, and the data-recorded-surface servo information $44b_1$ or when performing the dummy write process. Hence, it becomes possible to ensure the correct read operation and prevent the servo information from being erroneously deleted in the dummy write operation.

Figure 12:
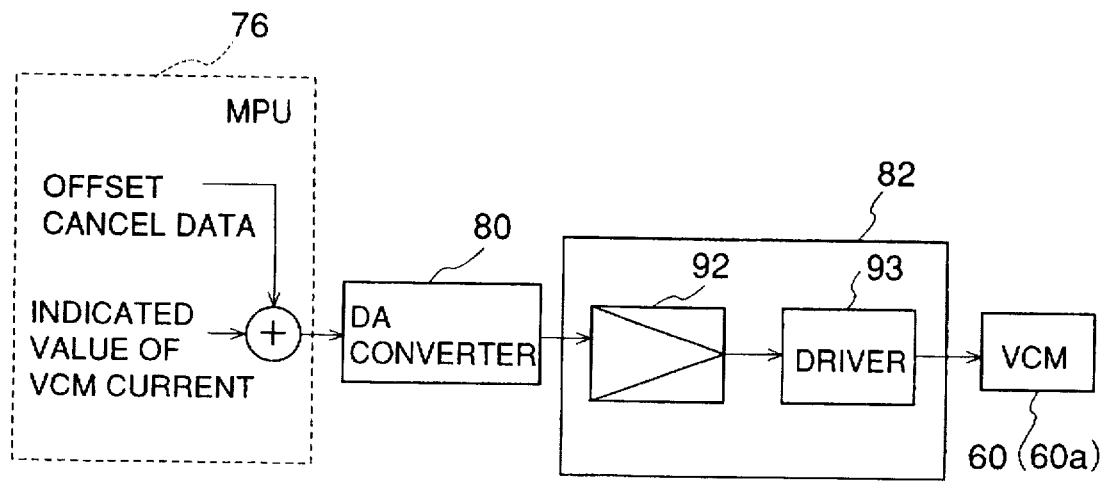
FIG. 12 is a block diagram of an offset cancel structure.

FIG. 12 is a block diagram of the offset cancel. A reaction force of the FPC 62 and retract force of the lock mechanism occur in the actuator 55. These forces function as an offset force, which must be canceled by the offset current. With the above in mind, every cylinder(s), the offset current related thereto is obtained from the average of the indicated values to be supplied to a D/A converter 80, and is stored in a memory of the MPU 76. The offset current (offset cancel data) is then added to the indicated value of the VCM current, and the resultant signal is applied to the D/A converter 80. The output signal of the D/A converter 80 is amplified of the VCM driver 82, and is applied to the VCM 60 via a driver 93 of the VCM 60.

As described before, the grease is provided in the periphery of the VCM 60. The grease stays in edge portions of the VCM 60 because the seek operation on the outermost cylinder $44b_2$ of the second OGB area 44b and the IGB area 45 is not frequently performed. It is possible to prevent a seek error arising from the stay of grease by performing the seek operation at predetermined intervals after the device 51 becomes the ready state in such a way that the servo head 56a (data head 56b) is moved to the outermost cylinder $44b_2$ of the second OGB area 44b, the outermost cylinder $44b_3$, the IGB area 45 or a cylinder located further in than the IGB area 45.

Each of the OGB areas 33 and 43 of the data disk 41 (servo disk 31) is partitioned into three so that the third OGB area (OGB3) is located so as to be further out than the other first and second OGB areas (on which the aforementioned surface analysis information and the data-recorded-surface servo information are recorded). When the RTZ operation is performed as shown in FIG. 8C, the seek operation is performed a given number of times so that the servo head 56a (data head 56b) is moved between the 0-th cylinder and the position in the OGB area 33 (43) in which the servo head 56a (data head 56b) is moved in the reverse direction, the above position being detected as the third OGB area (OGB3).

Hence, it is possible to agitate the grease around the VCM 60 corresponding to the positions of the first and second OGB areas 44a and 44b and to thus prevent a seek error which may occur when the surface analysis information $44a_1$ and the data-recorded-surface servo information $44b_1$ are read from the first and second OGB areas 44a and 44b by the seek operation.

The above-described embodiment of the present invention is based on the servo-surface servo type, but can be applied to the data-recorded-surface servo type.

A description will now be given of a second embodiment of the present invention.

Figure 13:
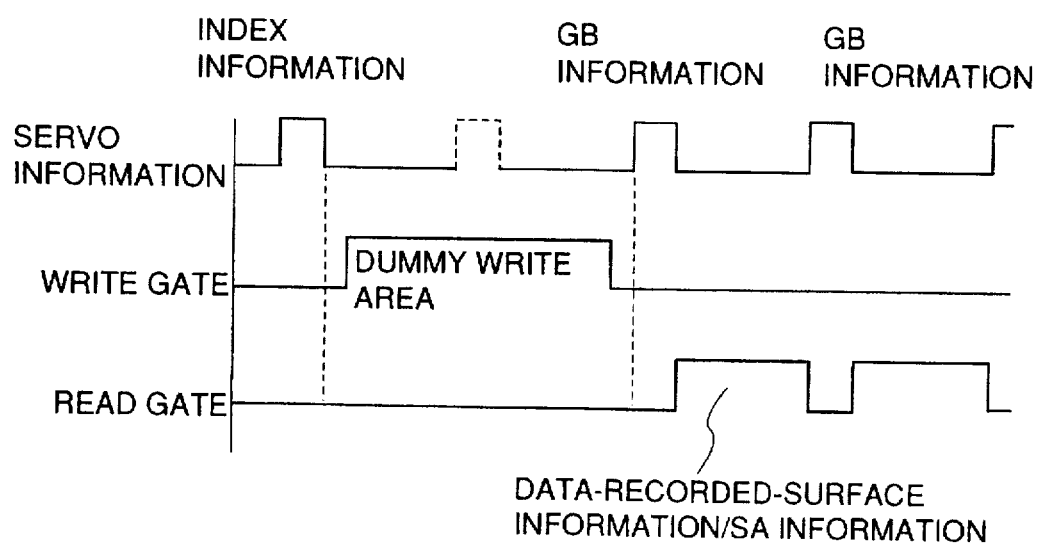
FIG. 13 is a timing chart of a second embodiment of the present invention.
Figure 14:
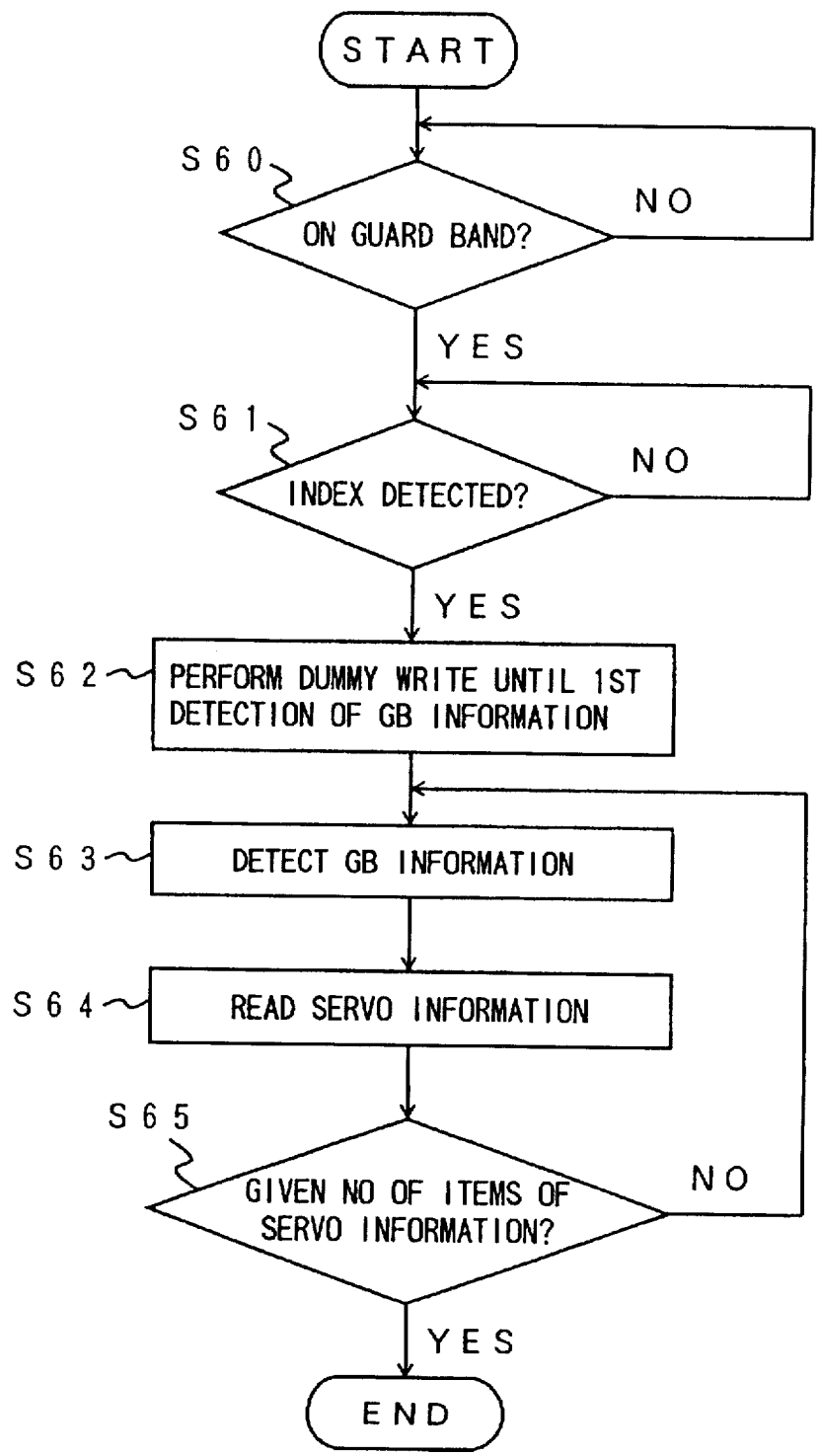
FIG. 14 is a flowchart of the operation shown in FIG. 13.

FIG. 13 is a timing chart of an operation of the second embodiment of the present invention, and FIG. 14 is a flowchart thereof. The second embodiment of the present invention has the following features. Out of the guard band (GB) information recorded on the respective cylinders of the first and second OGB areas 34a and 34b of the servo disk 31, the guard band information which should be recorded and located at given intervals with respect to the recorded index information is handled as non-recorded information (indicated by the broken line in FIG. 13). The write gate is opened during the interval between the index information and the first detected guard band information. In this state, dummy write data (which may be given servo information) is written in the given dummy write area.

In this case, the data disk 41 is formatted so that the servo information (data-recorded-surface servo information) and the surface analysis information (read gate) are arranged between the guard bands. The dummy write is carried out for the IGB area 45 as in the case of the first embodiment of the present invention.

Referring to FIG. 14, it is determined whether the head is on the guard band (step S60). When the result is affirmative, it is determined whether the index information is detected through the servo head 56a (step S61). The guard band information which should be originally encountered is not recorded. When the result of step S61 is affirmative, that is, when the index is detected, the dummy write is performed (step S62). The width of the write gate is set shorter than the time when the next guard band information is detected. Then, the data-recorded-surface servo information (surface analysis information) is read (step S64). The steps S64 and S65 are repeatedly performed until a predetermined number of items of the data-recorded-surface servo information is read (step S65).

Hence, it is possible to prevent the coming up of the index information (erroneous detection of the index information) due to write crosstalk noise in the write operation because there is no guard band information in the write operation.

In the above description, the dummy data is written into the IGB area 45. Alternatively, it is possible to write dummy data into idle part of cylinders in the first and second OGB areas 44a and 44b on which the surface area information and the data-recorded-surface servo information are recorded. With the above structure, it is possible to read the data-recorded-surface servo information and the surface analysis information from the cylinders immediately after the dummy data is written into the above cylinders. As a result, it becomes possible to prevent erroneous detection of the index information due to write crosstalk noise and to avoid the event in which the data-recorded-surface servo information or the surface analysis information may be erased.

A description will now be given of a modification of the second embodiment of the present invention.

Figure 15:
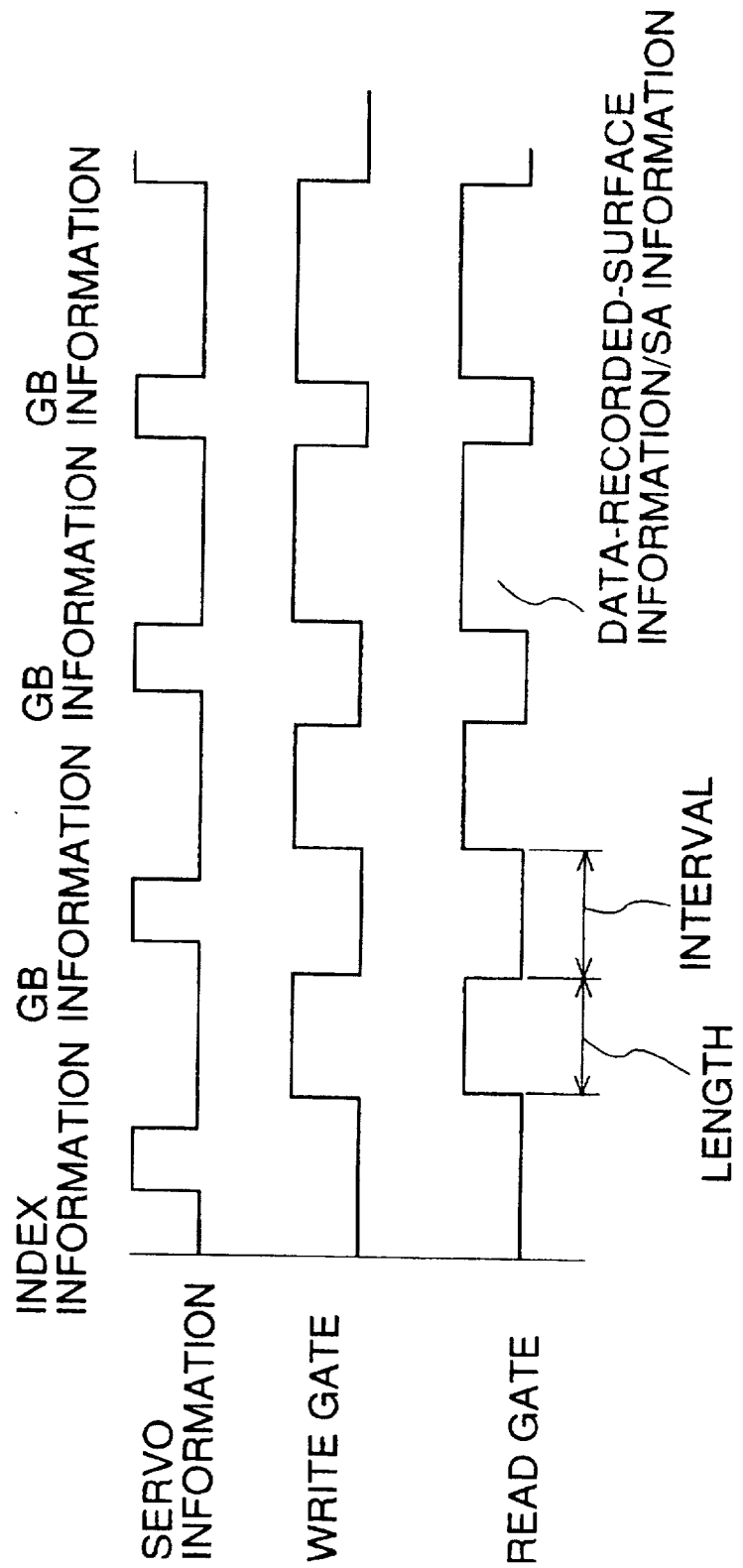
FIG. 15 is a timing chart of a modification of the second embodiment of the present invention.

FIG. 15 is a timing chart of an operation of the modification. In FIG. 15, the guard band information on the servo disk 31 is recorded at given intervals starting from the index information. That is, there is no non-recorded guard band information employed in the second embodiment of the present invention. The write gate is opened between the index information and the first guard band information and between the first guard band information and second (next) guard band information. While the write gate is in the open state, dummy data (which may be given servo information) is written into a predetermined dummy write area. In other words, the dummy write area is segmented with respect to the guard band information. That is, the length of the write gate (sector) and the interval between the write gates are determined so that the write gate does not overlap the guard band information.

The data-recorded-surface servo information and the surface analysis information are recorded on parts interposed between the items of the guard band information except for the first guard band information item. The dummy data may be written into the IGB area 45 or cylinders of the first and second OGB areas 44a and 44b as described previously.

According to the present invention, analysis information and data-recorded servo information are recorded on the outer guard band areas, and the inner guard band is used as a dummy write area. When it is confirmed that the heads are located on the corresponding areas, reading of information or dummy writing is carried out. Hence, it is possible to expand the data storage area because the analysis information is recorded on the guard band areas. Further, it is possible to perform the reading of information or the dummy writing after the positions of the heads are confirmed and to thus protect information on the disk.

Further, according to the present invention, the heads are driven to be positioned on the outermost track of the outer guard band area, and the seek operation between the inner guard band area and the outer guard band or the seek operation between the outermost outer guard band area and the zeroth cylinder. Hence, it is possible to ensure the seek operation directed to the outer guard band area without any influence of a grease of a bearing of the driving mechanism and to certainly position the heads.

Furthermore, according to the present invention, when recording the servo information, analysis information and dummy data on the guard band areas of the data disk, given guard band information is not recorded or recorded between guard band information items in a dividing way. Hence, it is possible to avoid any influence to the guard band information due to a write noise which may occur when writing information.

The present invention is not limited to the specifically disclosed embodiments, and variations and modifications may be made without departing from the scope of the present invention.

What is claimed is:

1. A control method for controlling a storage device including a dedicated servo disk and a corresponding servo head for reading servo information recorded thereon, and a predetermined number of data disks each having a corresponding recording/reproducing head, data surface servo information for correcting an off-track position of a recording/reproducing head being recorded on outer guard band areas of the data disks located further out in a radial direction of the disk than data areas, information recording/reproducing being performed through the recording/reproducing heads, the control method comprising the steps of:

(a) performing a seek operation using servo data read from the servo disk so that the recording/reproducing heads are moved to the outer guard band areas;

(b) confirming based on the guard band information read from the servo disk that the recording/reproducing heads are located in the outer guard band areas on which the data surface servo information is recorded; and (c) reading the data surface servo information from the outer guard band areas of the data disks.

2. The control method as claimed in claim 1, further comprising the step of writing dummy write data at a predetermined position on a selected one of the data disks while detecting servo information recorded on the servo disk.

3. A control method for controlling a storage device including a dedicated servo disk and a corresponding servo head for reading servo information recorded thereon, and a predetermined number of data disks each having a corresponding recording/reproducing head, data surface servo information for correcting an off-track position of a recording/reproducing head and analysis information concerning disk surfaces being recorded on outer guard band areas of the data disks located further out in a radial direction of the disk than data areas, information recording/reproducing being performed through the recording/reproducing heads, the control method comprising the steps of:

(a) performing a seek operation using servo data read from the servo disk so that the recording/reproducing heads are moved to the outer guard band areas;

(b) confirming based on the guard band information read from the servo disk that the recording/reproducing heads are located in the outer guard band areas on which the analysis information is recorded; and (c) reading the analysis information from the outer guard band areas of the data disks.

4. A control method for controlling a storage device including a dedicated servo disk and a corresponding servo head for reading servo information recorded thereon, and a predetermined number of data disks each having a corresponding recording/reproducing head, servo information for correcting an off-track position of a recording/reproducing head and analysis information concerning disk surfaces being recorded on outer guard band areas of the data disks located further out in a radial direction of the disk than data areas, inner guard band areas being provided closer in a radial direction to a rotating axis of the data disks than the data areas, information recording/reproducing being performed through the recording/reproducing heads, the control method comprising the steps of:

(a) performing a seek operation using servo data read from the servo disk so that the recording/reproducing heads are moved to the inner guard band areas which are used as areas into which dummy write data is written;

(b) confirming, based on the guard band information read from the servo disk that the recording/reproducing heads are located in the inner guard band areas; and (c) writing the dummy write data into the inner guard band areas of the data disks.

5. The control method as claimed in claim 4, wherein the step (c) is performed in a process of reading the servo information from the servo disk.

6. A control method for controlling a storage device including a dedicated servo disk and a corresponding servo head for reading servo information recorded thereon, and a predetermined number of data disks each having a corresponding recording/reproducing head, servo information for correcting an off-track position of a recording/reproducing head and analysis information concerning disk surfaces being recorded on outer guard band areas of the data disks located further out in a radial direction of the disk than data areas, inner guard band areas being provided closer in a radial direction to a rotating axis of the disks than the data areas, information recording/reproducing being performed through the recording/reproducing heads, the control method comprising the steps of:

(a) performing a seek operation using servo data read from the servo disk so that the recording/reproducing heads are moved to the outer guard band areas which are used as areas into which dummy write data is written;

(b) confirming, based on the guard band information read from the servo disk that the recording/reproducing heads are located in the inner guard band areas; and (c) writing the dummy write data into the outer guard band areas of a selected one of the data disks.

* * * * *